March 11, 1969  G. W. HUGHES  3,431,776
ROAD SURFACE TESTING DEVICE
Filed Dec. 14, 1966
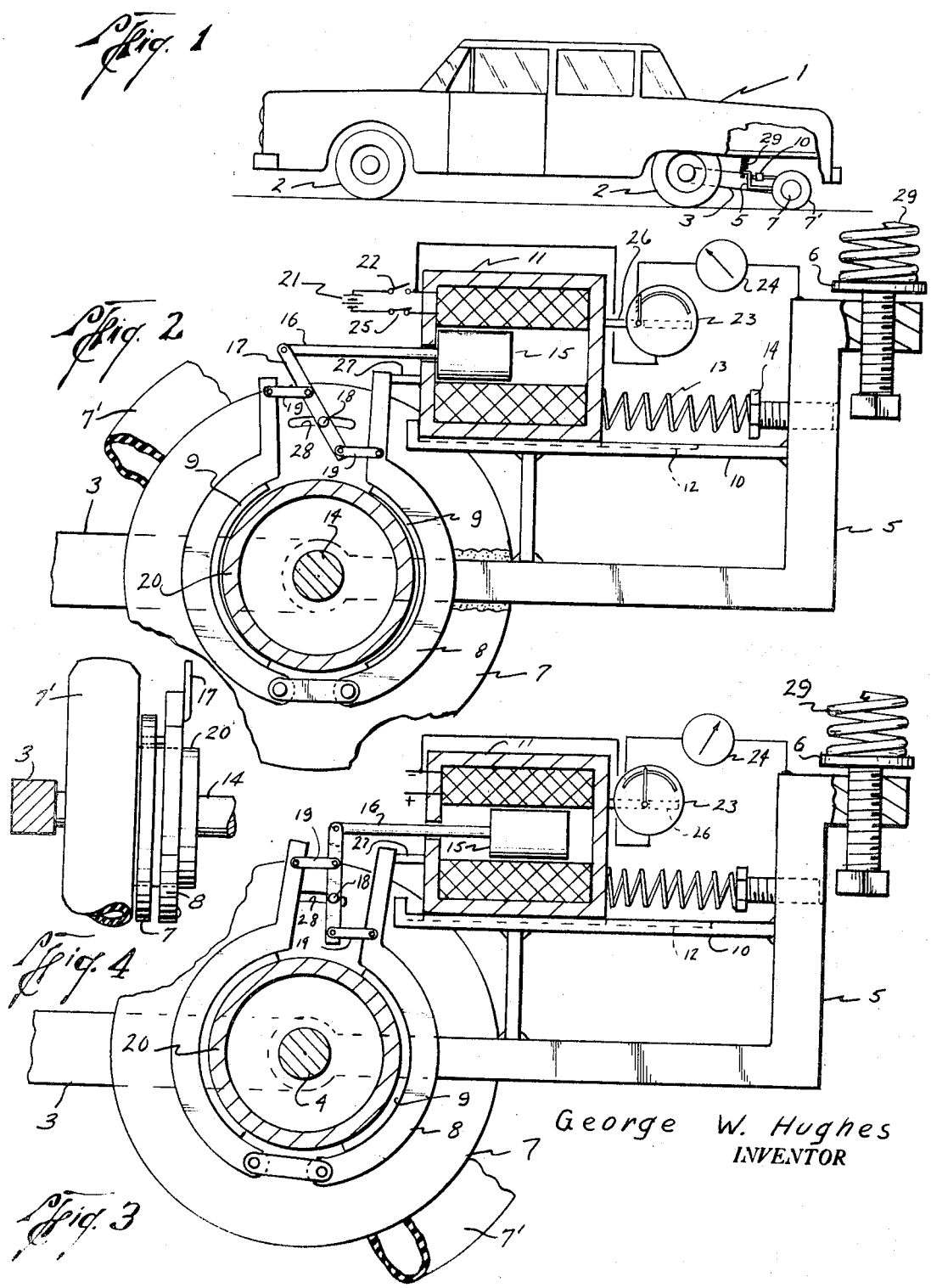
George W. Hughes
INVENTOR United States Patent Office 3,431,776
Patented Mar. 11, 1969

3,431,776
ROAD SURFACE TESTING DEVICE
George W. Hughes, 3405 Ennis, Houston, Tex. 77004
Filed Dec. 14, 1966, Ser. No. 601,701
U.S. Cl. 73—146
Int. Cl. E01c 23/01
6 Claims

ABSTRACT OF THE DISCLOSURE

The invention is for the purpose of providing a means for testing the surface of a roadway, paving, or the like, with reference to the skid factor for vehicles traveling over same. The device tests the skid factor automatically upon release of the accelerator of the vehicle being tested, by applying a brake to a wheel in contact with the road surface, and transmitting to a gauge on the dashboard the amount of pressure required to cause the wheel to slide. This indicates the condition of the road with reference to the skid factor to the driver before he applies the brakes to the vehicle wheels.

Background of the invention

In driving motor vehicles, one of the safety factors involved is the condition of the road surface being traversed. This condition may vary at frequent intervals, and the skid factor of the particular vehicle on the road surface at a particular place is extremely important in the manner of application of the brakes of the vehicle as a safety factor. Where a dry surface is encountered, if the roadway is hard, considerable pressure will be required to cause the vehicle wheels to skid. In such instance, the brakes may be applied severely, if desired. Where the roadway is slick, or where loose gravel is encountered, or similar skid factors are present, very little pressure is required to cause the vehicle wheels to slide when the brakes are applied, and in such instances, the brake application must be light and cautious. It is an object of this invention to provide means for determining the skid factor of the particular roadway for the particular vehicle and transmitting this information to the driver of the vehicle automatically and immediately upon deacceleration and before the brakes are applied.

Summary of the invention

The purpose of the invention is accomplished by testing the skid factor of the road surface by a drawn wheel attached to the vehicle adjacent one of the standard rear wheels, which said wheel has a brake mechanism which is applied electrically through a circuit powered by the vehicle battery and a switch activated by the release of the accelerator which in turn activates an electro-magnetic solenoid. When this brake mechanism is applied, the power required to stop the rotation of the drawn wheel is measured and the information obtained transmitted to a gauge on the vehicle dashboard.

Brief description of the drawing

FIGURE 1 is a side elevational schematic view of a vehicle with the testing device attached.

FIGURE 2 is an enlarged side elevational view of the testing mechanism, shown partially in cross section, and illustrating the position of the parts in inactive relation, and FIGURE 3 is an enlarged side elevational view of the testing device, showing the position of the parts in brake applied position.

Description of the preferred embodiment

In the drawings the numeral 1 designates a vehicle having the usual wheels 2 and having an electrical system and battery (not shown). On the rear axle housing of the vehicle is pivotally anchored the tongue 3 which extends from the axle of the vehicle and is rotatably secured at its extended end to the testing wheel axle 4. A framework 5 is pivotally connected at one end to said axle 4 and at its other end to the tension adjusting plate 6.

A wheel 7' is rotatably mounted on the axle 4, and has a brake mechanism mounted therein consisting of the disc 7 rigidly secured to the frame 5, and through which the hub 20 of the wheel 7' extends, and pivotally mounted shoes 8, 8, on which suitable linings 9, 9 are mounted. Tension means, as 29, adjustably maintains the desired tension on the wheel 7' to simulate the load of the vehicle on the vehicle wheels 2, 2.

Mounted on the framework 5 is the electromagnet support 10 on which the electromagnet 11 is slidably mounted in the groove 12. A tension spring 13 bears against said electromagnet 11 at one end, and its other end bears against the tension adjusting nut 14.

A plunger 15, in the electromagnet 11, has the outwardly extending shaft 16 which is pivotally mounted at its extended end to one end of the brake shoe actuating member 17, which is pivotally mounted at 18 and which has the connecting links 19, 19 pivotally mounted in longitudinal alignment on opposite sides of the fulcrum 18, said links having their other ends mounted on the respective brake shoes 8, 8 and the brake shoes adjacent the housing 11 being positioned to contact the stud 27 of the housing 11, as it moves in response to the movement of the member 17 upon application of the brake, the fulcrum 18 traveling in the slot 28 and the brake shoes rotating around the drum 20 in the direction of rotation of the wheel 7'.

An electrical circuit has its source of power in the vehicle battery 21 and a switch 22 is actuated by the accelerator of the vehicle (not shown) to move the switch into closed position upon release of the accelerator by the operator, preparatory to a stop. The circuit continues through the potentiometer 23 mounted on the framework 5 and through the gauge 24 mounted on the dashboard of the vehicle. Thence to a suitable ground as on the vehicle framework. A manually closed switch 25 is mounted in the circuit, preferably on the dashboard, to selectively deactivate the device. An actuating shaft 26 extends from the potentiometer 23 to the electromagnet housing 11. When the switch 25 is closed, the device is ready for operation.

As the vehicle is driven over a roadway, the load on the wheel 7' will have been equalized to simulate the load on the wheel 2 by adjusting the tension means 29. As the driver lifts his foot off of the accelerator, the switch 22 is closed and the electromagnetic solenoid 11 is excited, drawing the plunger 15 rearwardly, and applying the brake mechanism to the wheel 7'. As the plunger 15 moves in response to the electrical current, one of the members 18 of the brake mechanism bears against the stud 27 on the electromagnet housing 11 and moves the housing rearwardly against the spring 13, moving the shaft 26 of the potentiometer 23 until the wheel 7' slides. The amount of pressure required to cause the wheel 7' to slide, as measured by the potentiometer 23, will be reflected on the gauge 24 and the driver of the vehicle will be able to determine the skid factor of the road surface. When the accelerator is again depressed to activate the vehicle, the switch 22 will be opened and the testing mechanism deactivated.

While the foregoing is considered a preferred form of the invention, it is by way of illustration only.

What I claim is:

1. In a road surface testing device for vehicles, a wheel support anchored to the axle housing of a vehicle, a rotatable wheel mounted on said support, said wheel being in contact with the road surface to be tested, a brake mechanism affixed to said support, and in cooperating relation with said wheel, means for selectively applying said brake mechanism to apply force to stop the rotation of said wheel when the vehicle is in motion and means for transmitting information as to the force required to stop said rotation to the dashboard of said vehicle.

2. The device defined in claim I wherein said wheel support is provided with a stabilizing framework mounted at one end to the framework of said vehicle.

3. The device defined in claim 1 wherein said brake mechanism consists of brake shoes and linings and a brake drum, and said means for selectively applying said brake mechanism comprises an electromagnetic having an oscillating plunger and an actuating shaft connected thereto, said shaft extending outwardly from said plunger and being pivotally mounted on its extended end to said brake shoes, and the means for transmitting information includes means for resisting the rearward movement of said electromagnet and means for measuring the distance of movement of said magnet.

4. The device defined in claim 1 wherein said means for selectively applying said brake mechanism comprises an electromagnet, said electromagnet having means for actuation of the brake mechanism and being mounted on said wheel support to move rearwardly in response to the contact when said brake mechanism is applied, yieldable means restraining said rearward movement, and measuring means actuated by said movement, having a gauge in connection therewith for remotely reading the movement measured by said measuring means.

5. The device defined in claim 1 wherein the means for selectively applying said brake mechanism is actuated by the release of the accelerator of the vehicle.

6. The device defined in claim 1 wherein the said wheel in contact with the road surface is pivotally mounted on the vehicle axle supporting the rear wheels, and adjustable tension means are provided to simulate the load carried by the vehicle and to bring a proportionate amount of vertical pressure on said wheel.

References Cited
UNITED STATES PATENTS 2,690,668   10/1954   Lucas _____ 73—146 XR LOUIS R. PRINCE, *Primary Examiner*.

DONALD O. WOODIEL, *Assistant Examiner*.

U.S. Cl. X.R.

188—181